United States Patent
Barlet et al.

(10) Patent No.: US 10,682,211 B1
(45) Date of Patent: Jun. 16, 2020

(54) MIXING SYSTEM AND A METHOD OF PREPARING AN ORAL CARE COMPOSITION

(71) Applicant: Willo 32 SAS, Limoges (FR)

(72) Inventors: David Aurélien Barlet, Rilhac-Rancon (FR); Marc Sednaoui, Limoges (FR); Jean-Raphaël Ouin, Paris (FR)

(73) Assignee: Willo 32 SAS, Limoges (FR)

( * ) Notice: Subject to any disclaimer, the term of this patent is extended or adjusted under 35 U.S.C. 154(b) by 0 days.

(21) Appl. No.: 16/270,026

(22) Filed: Feb. 7, 2019

(51) Int. Cl.
  *A61C 17/02* (2006.01)
  *A61C 17/22* (2006.01)
  *A61C 1/00* (2006.01)

(52) U.S. Cl.
  CPC ........ *A61C 17/0205* (2013.01); *A61C 1/0061* (2013.01); *A61C 17/22* (2013.01)

(58) Field of Classification Search
  CPC ...... A61C 17/0205; A61C 1/0061; A61C 1/22
  USPC ..................................... 433/80–90
  See application file for complete search history.

(56) References Cited

U.S. PATENT DOCUMENTS

| | | | |
|---|---|---|---|
| 4,674,658 A * | 6/1987 | Van Brocklin | A61C 17/02 137/576 |
| 4,941,459 A | 7/1990 | Mathur | |
| 7,082,638 B2 | 8/2006 | Koh | |
| 7,537,451 B1 | 5/2009 | Ramnarine | |
| 8,448,282 B2 | 5/2013 | Stapelbroek | |
| 8,617,090 B2 | 12/2013 | Fougere | |
| 8,635,731 B2 | 1/2014 | Garner | |
| 8,667,634 B2 | 3/2014 | Steur | |
| 8,745,802 B2 | 6/2014 | Steur | |
| 8,863,346 B2 | 10/2014 | Headstrom | |
| 8,978,189 B1 | 3/2015 | Sexton | |
| 8,990,992 B2 | 3/2015 | Stapelbroek | |
| 9,084,655 B2 | 7/2015 | Sahoo | |
| 9,277,980 B2 | 3/2016 | Leveling | |
| 9,308,065 B2 | 4/2016 | Steiner | |
| 9,504,542 B2 | 11/2016 | De Gentile | |
| 9,526,597 B2 | 12/2016 | Steur | |
| 9,636,195 B2 | 5/2017 | Wolpo | |
| 9,636,197 B2 | 5/2017 | Khangura | |
| 9,668,840 B2 | 6/2017 | Miller | |
| 9,907,633 B2 | 3/2018 | Wolpo | |
| 2007/0184404 A1 | 8/2007 | Johnki | |
| 2010/0273125 A1 | 10/2010 | Janssen et al. | |
| 2016/0113745 A1 | 4/2016 | Golub | |

(Continued)

FOREIGN PATENT DOCUMENTS

| | | |
|---|---|---|
| EP | 2654609 B1 | 3/2018 |
| EP | 2654611 B1 | 4/2018 |

(Continued)

OTHER PUBLICATIONS

International Search Report and Written Opinion dated Apr. 30, 2020 from International Application No. PCT/IB2020/050848, 10 pages.

*Primary Examiner* — Yogesh P Patel
(74) *Attorney, Agent, or Firm* — Daylight Law, P.C.

(57) ABSTRACT

A mixing system adapted for installation within an oral care appliance and a method of preparing an oral care composition to be delivered to a mouthpiece of the oral care appliance are disclosed. Some of the disclosed systems and methods allow for the generation of an on-demand oral care composition for use in dental cleaning.

19 Claims, 8 Drawing Sheets

(56) References Cited

U.S. PATENT DOCUMENTS

| | | |
|---|---|---|
| 2016/0135581 A1 | 5/2016 | Pai |
| 2016/0206415 A1 | 7/2016 | Kraft |
| 2016/0270892 A1 | 9/2016 | Yoo |
| 2017/0367801 A1 | 12/2017 | Fitzgerald |
| 2018/0000573 A1 | 1/2018 | Miller |
| 2018/0184795 A1 | 7/2018 | Pai |
| 2018/0184857 A1 | 7/2018 | Pai |

FOREIGN PATENT DOCUMENTS

| | | |
|---|---|---|
| WO | 2017061980 A1 | 4/2017 |
| WO | 2017146366 A1 | 8/2017 |
| WO | 2018160986 A1 | 9/2018 |

\* cited by examiner

MIXING SYSTEM AND A METHOD OF PREPARING AN ORAL CARE COMPOSITION

BACKGROUND OF THE INVENTION

Dental cleaning plays a significant role in impacting the overall health of an individual. Many people schedule frequent visits to a dentist for regular checkups and cleaning operations. Various types of cleaning agents such as water, toothpaste, disinfecting fluid, etc. are used for dental cleaning. An oral care composition made up of one or more of these cleaning agents is sometimes prepared at a dental facility prior to use for dental treatment. This preparation can include manual techniques for combining the various elements of the composition.

There are numerous drawbacks associated with traditional methods and systems for generating oral care compositions. First, manual mixing requires consistent metering and control in accordance with the specificity of the dental problem of the patient or the recommended dosage. Further, generating the appropriate composition can be a time sensitive activity as it will delay the patient's treatment and extend the duration of a given office visit. Second, the mixing environment needs to be controller. A sterile environment and hygiene is required to prepare oral care composition or mixture. Moreover, the materials of the pouches or sachets used for storing cleaning agents require careful selection as the cleaning agents may be reactive and may harm the equipment in case of leakage. Third, the devices used for mixing may be large and bulky, making the overall system less portable. Further, the devices used in mixing require maintenance at regular intervals which increases the overall operational cost of the appliance.

SUMMARY OF THE INVENTION

Specific embodiments of the present invention disclosed herein relate to the technical field of oral care appliances and methods of use thereof. In particular, specific embodiments of the present invention disclosed herein relate to a mixing system adapted for installation within an oral care appliance and a method of preparing an oral care composition.

Specific embodiments of the present invention disclosed herein overcome one or more of the above-mentioned problems with a mixing system adapted for installation in an oral care appliance and a method of preparing an oral care composition. These solutions also provide an easy to maintain and a convenient mixing system for an oral care appliance.

Specific embodiments of the invention disclosed herein include a mixing system adapted for installation within an oral care appliance. The oral care appliance may be used for cleaning, polishing, whitening, halitosis abatement, and in other general oral care applications. Further, specific embodiments of the invention disclosed herein include a method of preparing an oral care composition to be delivered to a mouthpiece of the oral care appliance.

Specific embodiments of the present invention include a mixing system adapted for installation within an oral care appliance which comprises at least: a housing comprising of a first inlet port and a second inlet port wherein the first inlet port is connected to a first cartridge incorporating a concentrated active composition and the second inlet port is connected to a second cartridge incorporating a neutral solution; and a mixing chamber enclosed within the housing wherein the mixing chamber is configured to intermix a controlled quantity of the concentrated active composition received through the first inlet port and the neutral solution received through the second inlet port thereby resulting in dilution of the concentrated active composition in the mixing chamber.

The active composition referred to herein could be: a polishing agent such as an inert abrasive; a cleaning agent such as fluoride, activated charcoal, or a fluoride-free antibacterial composition; a halitosis treatment agent such as chlorine dioxide; or a whitening agent such as hydrogen peroxide. The active composition could also be any mixture of these kinds of agents and chemicals.

The mixing system can further comprise an outlet port connected to a mouthpiece of the oral care appliance. The first cartridge can be a rigid and a sealed cartridge. The mixing system can further comprise an air injection assembly to inject air in the first cartridge.

Specific embodiments of the present invention provide a mixing system comprising means to control flow rate of the concentrated active composition from the first cartridge into the mixing chamber in accordance with flow of the neutral solution into the mixing chamber.

Specific embodiments of the present invention provide a mixing assembly, wherein the flow rate of the concentrated active composition from the first cartridge into the mixing chamber is controlled by calibrating pressure loss on the first cartridge outlet connected to the first inlet port.

Specific embodiments of the present invention provide a mixing system in which the flow rate of the concentrated active composition from the first cartridge into the mixing chamber is controlled by a servo valve or a pump.

Specific embodiments of the present invention provide a first cartridge that further comprises of at least one orifice to dispense concentrated active composition as well as to inject air into the first cartridge.

Specific embodiments of the present invention provide a mixing system, wherein the first cartridge is positioned on a base wherein the base provides connection of the first cartridge with the mixing chamber.

Specific embodiments of the present invention provide a mixing system, in which the base punctures the first cartridge at the orifice with a needle having at least two channels of different dimensions with the channel having smaller dimension configured as an air inlet and the channel having larger dimension configured to dispense the concentrated active composition from the first cartridge into the mixing chamber. In specific embodiments, the dimension is a mean channel cross section surface area measured along the length of the channel. In specific embodiments, the dimension is a minimum channel cross section surface area measured along the length of the channel.

Specific embodiments of the present invention provide a base that comprises a pre-mixing chamber with an air aperture.

Specific embodiments of the present invention provide a mixing system, wherein the pre-mixing chamber is arranged to form a sealed connection with the first cartridge when the first cartridge is positioned on the base.

Specific embodiments of the present invention provide a mixing chamber that comprises a venturi-effect based arrangement to control flow rate of the concentrated active composition from the first cartridge into the mixing chamber.

Specific embodiments of the present invention provide a method of preparing an oral care composition to be delivered to a mouthpiece of an oral care appliance, the method comprising: aspirating a controlled quantity of at least one active composition and at least one neutral solution into a mixing chamber; wherein the active composition is delivered through a first cartridge connected to a first inlet port of the mixing chamber and the neutral solution is delivered through a second cartridge connected to a second inlet port of the mixing chamber; mixing the active composition with the neutral solution to prepare the oral care composition; and delivering the oral care composition to the mouthpiece of an oral care appliance wherein the mouthpiece is connected to an outlet port of the mixing chamber.

Specific embodiments of the present invention provide a controlled amount of active composition dispensed from the first cartridge.

Specific embodiments of the present invention provide an active composition comprising at least one concentrated cleaning agent.

Specific embodiments of the present invention provide a method of preparing an oral care composition, wherein the first cartridge and the second cartridge form an integrated unit (e.g., a single cartridge containing at least one neutral solution and one active agent separated in different compartments).

Specific embodiments of the present invention provide a method in which the flow rate of the delivery of active composition from the first cartridge into the mixing chamber is controlled by flow control means.

Specific embodiments of the present invention provide a method of preparing an oral care composition, wherein the flow rate of the active composition from the first cartridge into the mixing chamber is controlled by calibrating pressure loss on the first cartridge outlet connected to the mixing chamber.

Specific embodiments of the present invention provide a method of preparing an oral care composition, wherein the flow rate of the active composition from the first cartridge into the mixing chamber is controlled by a servo valve or a pump.

Specific embodiments of the present invention provide a method of preparing an oral care composition, wherein the first cartridge is positioned on a base, wherein the base provides connection of the first cartridge with the mixing chamber.

Specific embodiments of the present invention provide a method of preparing an oral care composition, wherein the base comprises a pre-mixing chamber with an air aperture.

Specific embodiments of the present invention provide a method of preparing an oral care composition, wherein the base punctures the first cartridge at an orifice with a needle having at least two channels of different dimensions with the channel having smaller dimension configured as an air inlet and the channel having larger dimension configured to dispense the active composition from the first cartridge into the mixing chamber.

Specific embodiments of the present invention provide a method of preparing an oral care composition, wherein the mixing chamber comprises of a venturi-effect based arrangement to control flow rate of the active composition from the first cartridge into the mixing chamber.

Specific embodiments of the present invention achieve good dosing of the active composition and the neutral solution to ensure that a right amount of the active composition is mixed with the neutral solution for application in the oral care appliance.

One or more of the embodiments/steps of the invention can also be automated completely or partially using one or more of the components such as an actuating means, timer, pressure sensor and software.

DETAILED DESCRIPTION

Aspects of the present invention can be understood by reference to the figures and description set forth herein. However, the following descriptions, and numerous specific details thereof, are given by way of illustration and not of limitation. Many changes and modifications to the specific descriptions may be made without departing from the spirit and scope thereof, and the present invention includes all such modifications. It is to be understood that the disclosed embodiments may or may not overlap with each other. Thus, part of one embodiment, or specific embodiments thereof, may or may not fall within the ambit of another, or specific embodiments thereof, and vice versa.

Aspects of specific embodiments of this invention will be presented using specific examples and will be represented in different figures. For clarity and ease of description, each aspect includes only a few embodiments. Different embodiments from different aspects may be combined or practiced separately, to design a customized process depending upon application requirements. Many different combinations and sub-combinations of a few representative processes shown within the broad framework of this invention, that may be apparent to those skilled in the art but not explicitly shown or described, should not be construed as precluded.

This disclosure is generally drawn, inter alia, to appliances, systems, and methods to maintain oral care health and hygiene.

Throughout the specification, whenever an active composition is disclosed, a concentrated active composition could be used in its place.

Figure 1:
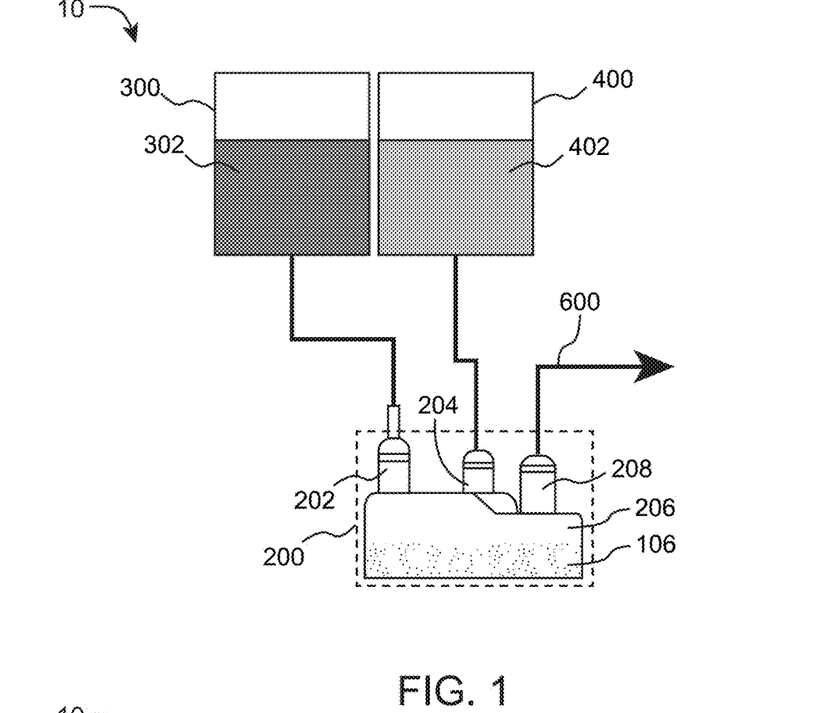
FIG. 1 illustrates a mixing system 10 adapted for installation within an oral care appliance in accordance with specific embodiments of the present invention.

FIG. 1 illustrates a mixing system 10 adapted for installation within an oral care appliance according to the presently disclosed subject matter. The mixing system 10 comprises at least a housing 200 and a mixing chamber 206 enclosed within the housing 200. The housing 200 further comprises a first inlet port 202 connected to a first cartridge 300 incorporating an active composition 302. The housing 200 also comprises a second inlet port 204 connected to a second cartridge 400 incorporating a neutral solution 402. The mixing system 10 is configured to intermix a controlled quantity of the active composition 302 received through the first inlet port 202 and the neutral solution 402 received through the second inlet port 204 thereby resulting in dilution of the active composition 302 in the mixing chamber 206.

The mixing system 10 is configured to achieve good dosing of the active composition 302 and the neutral solution 402 to ensure that a right amount of the active composition 302 is mixed with the neutral solution 402 for application in the oral care appliance. The oral care appliance may be utilized for cleaning, whitening, curing specific oral diseases and in other general oral care applications.

The housing 200 further comprises an outlet port 208 connected to a mouthpiece 102 of the oral care appliance through a connecting line 600 configured to supply an intermixed oral care composition 106.

In specific embodiments of the invention, the mixing system 10 can be connected to a toothbrush, a mouthpiece, a flosser, a jet spray or other similar dental cleaning devices to deliver a controlled quantity of the intermixed oral care composition 106.

In specific embodiments of the invention, the mixing system 10 can be connected to more than one mouthpiece 102 or similar cleaning devices to be used inside the mouth.

Figure 2:
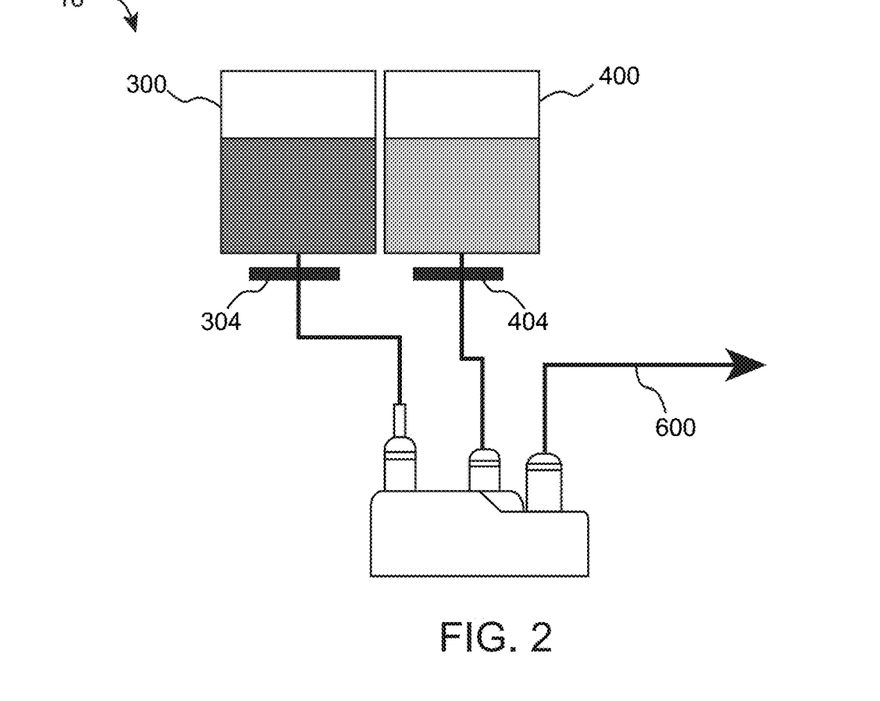
FIG. 2 illustrates a mixing system 10 adapted for installation within an oral care appliance with check valves 304 and 404 in accordance with specific embodiments of the present invention.

In specific embodiments of the invention, the quantity of the active composition 302 and the neutral solution 402 is carefully controlled to achieve a desired result. FIG. 2 illustrates a mixing system 10 adapted for installation within an oral care appliance with check valves 304 and 404. The first check valve 304 is provided between the first cartridge 300 and the first inlet port 202 provided on the housing 200 and the second check valve 404 is provided between the second cartridge 400 and the second inlet port 204. The check valves 304 and 404 help in regulating the quantity of the active composition 302 dispensed from the first cartridge 300 and neutral solution 402 dispensed from the second cartridge 400, respectively. The check valves 304 and 404 also inhibits the first cartridge 300 and the second cartridge 400 from experiencing the communicating vessels effect which could balance the levels of the active composition 302 in the first cartridge 300 and the neutral solution 402 in the second cartridge 400. The check valves thereby prevent an undesirable uncontrolled mixing between the active composition 302 and the neutral solution 402 that could otherwise occur.

In specific embodiments of the invention, the check valves 304 and 404 can be made of silicon or any other flexible material suitable for such an application. Examples of flexible materials can be, but are not limited to, rubber, plastic, silicone, latex, polymer, and other soft and flexible material suitable for oral care applications.

Thermoplastic elastomer (TPE) are suitable as flexible materials for oral care applications. They are copolymers consisting in a physical mix of polymers having plastic and elastomeric properties. Furthermore, they have a suitable temperature range of operation, between −10° C. and 80° C. They can have good food and medical grade properties as well as an absence of significant creep. Furthermore, they have good tearing and tensile strength. This makes TPEs suitable for constituting the flexible material of the mouthpiece 102.

Silicone is another polymer suitable as flexible material for oral care applications. It is a very stable polymer with low chemical reactivity. Furthermore, it is stable over a large range of temperature (between −100° C. and 250° C.). It also has excellent creep, tear strength and elongation properties. In addition, it also has good food and medical grade properties making it suitable for the flexible material of the mouthpiece 102.

In specific embodiments of the invention, the check valves 304 and 404 can be electrically or mechanically operated valves.

In specific embodiments of the invention, check valves 304 and 404 can be open or close for a set time defined by a timer, software, a pressure sensor, or any other actuating means. The set time, or value of other parameters involved with operation of the valves, can be chosen depending on the requirements of the mixing of the active composition 302 and the neutral solution 402.

The active composition 302 and neutral solution 402 can take on various forms. In specific embodiments of the invention, the active composition 302 can be in solid, liquid, gaseous, gel, emulsion form or a combination thereof. In specific embodiments of the invention, the active composition 302 comprises at least one concentrated cleaning agent. In specific embodiments of the invention, the active composition 302 can include oral cleaning agents such as dentifrice, toothpaste, anti-bacterial compositions, abrasive particles such as hydrated silica, fluoride powder etc. or a combination thereof. In a specific example, the active composition 302 can be a concentrated active composition. A controlled quantity of the concentrated active composition can be mixed with the controlled quantity of the neutral solution 402, thereby resulting in dilution of the concentrated active composition. In specific embodiments of the invention, the neutral solution 402 can include a neutral fluid, such as water and other neutral diluting agents.

In specific embodiments of the invention, the first cartridge 300 and the second cartridge 400 can comprise the same, or similar, compositions or liquid. Further, the two cartridges 300 and 400 can be switched (i.e. the first cartridge 300 incorporates the neutral solution 402 whereas the second cartridge 400 incorporates the active composition 302).

In specific embodiments of the invention, the first cartridge 300 and the second cartridge 400 can comprise an already mixed solution. The already mixed solution in the cartridges 300 and 400 can be the same or different depending on the usage. The controlled amount/volume of already mixed solutions can be dispensed to the mixing chamber 206 for inter-mixing and then supplied to the mouthpiece 102 of the oral care appliance through the connecting line 600.

In specific embodiments of the invention, a single cartridge can incorporate the active composition 302 and the neutral solution 402. The single cartridge can be provided with a separating wall to form two compartments, one compartment incorporates the active composition 302 and other compartment incorporates the neutral solution 402. The integrated cartridge can be provided with different outlet ports for dispensing the active composition 302 and the neutral solution 402 into the mixing chamber 206 enclosed within the housing 200. One of the advantages of this solution is that the bulkiness of the cartridge is limited.

In specific embodiments of the invention, the mixing system 10 of the invention can be provided with more than two cartridges. The multiple cartridges may contain a plurality of the same or different solutions or compositions. Similarly, in another embodiment of the invention, the mixing chamber 206 can comprise a plurality of inlet ports 202 and 204 and a plurality of outlet ports. The multiple inlet ports can receive the multiple cartridges. Similarly, in another embodiment of the invention, the invention can be provided with several mixing chambers 206, connected to more than one cartridge containing active composition or neutral solution.

In another embodiment of the invention, the amount of the active composition 302 dispensed from the first cartridge 300 and the neutral solution 402 dispensed from the second cartridge 400 can be controlled by incorporating a pump, a solenoid valve, a servo-valve, a valve controlled by a pneumatic circuit (i.e. pneumatic control valve), any electronic valve with a pinch valve, a membrane valve, or any other fluid distributor arranged with the first cartridge 300 and the second cartridge 400.

Figure 3:
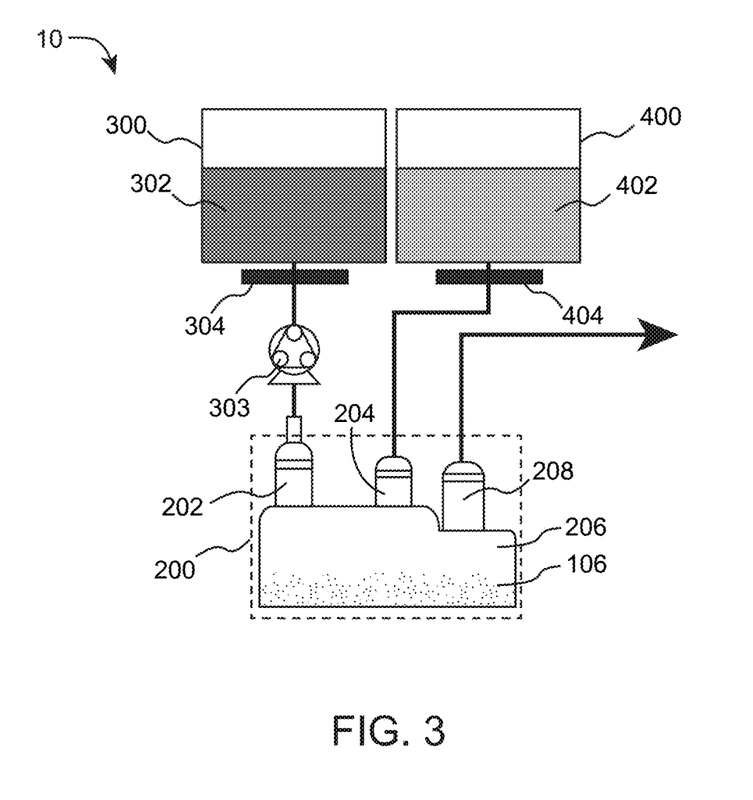
FIG. 3 shows that the arrangement of a peristaltic pump 303 between the first cartridge 300 and the housing 200 in accordance with specific embodiments of the present invention.

Specific embodiments of the invention can include a peristaltic pump placed between the housing of a mixing chamber and a cartridge of the active composition. FIG. 3 shows that the amount of the active composition 302 dispensed from the first cartridge 300 can be controlled by a peristaltic pump 303. In the illustrated case, the peristaltic pump 303 is placed between housing 200 and the first cartridge 300. The peristaltic pump, such as peristaltic pump 303, allows for fine control of the quantity of the active composition 302 to be mixed with the neutral solution 402. Furthermore, using a peristaltic pump, the mixing ratio can be adjusted accordingly to the required composition of the inter-mixed solution 106. As such, the same cartridges and mixing chamber hardware could be applied to formulate compositions with different requirements. Furthermore, the peristaltic pump can also be placed on the operative connection between the inlet 204 and the neutral solution 402 to ensure a good dosing of the neutral solution. In another embodiment, both the neutral solution 402 and active composition 302 connections are linked to a peristaltic pump to ensure a precise dilution.

In specific embodiments of the invention, the cartridges can take on various forms. For example, in FIG. 11, each of the first cartridge 300 and the second cartridge 400 could be configured to have a flexible membrane. The flexible membrane could be deformed to push the active composition 302 out from the first cartridge 302 and the neutral solution 402 out from the second cartridge 400 under the effect of pressure. In specific embodiments of the invention, the cartridges 300 and 400 can be made of deformable material that can be deformed under pressure. Thus, cartridges 300 and 400 act as inflatable cartridges. For instance, when the top of the cartridges 300 and 400 are inflated with a fluid, the flexible membranes deform and transfer the overpressure to the solutions contained in the cartridges 300 and 400 thus pushing them into the housing 200. In a specific embodiment of the invention, the first cartridge 300 and the second cartridge 400 may be rigid and sealed cartridges in order to use them for storage and transportation purposes. The first cartridge 300 and second cartridge 400 can be made up of any suitable rigid material known to persons of skilled in the art which are suitable for this purpose. In yet another embodiment, one or the two cartridges are delivered underpressure so that the solutions contained are easily and steadily flowing out of the cartridges.

In specific embodiments of the invention, the first cartridge 300 and the second cartridge 400 can be disposable cartridges. The first cartridge 300 and the second cartridge 400 can be watertight and removable from the mixing system 10. The first cartridge 300 and the second cartridge 400 may be removed, and potentially disposed of, after dispensing the active composition 302 and the neutral solution 402. In some cases the first cartridge 300 and the second cartridge 400 may be removed, and potentially disposed of, after the quality of the first cartridge 300 and the second cartridge 400 is deteriorated due to constant usage, transportation or the elapsing of a defined expiry date of the active composition 302.

In specific embodiments of the invention, the cartridges can be configured to dispense of their contents in various ways. The cartridges 300 and 400 can comprise at least one orifice to dispense the compositions or solutions from them as well as to inject air into the cartridges 300 and 400. The orifice of the cartridges 300 and 400 can be sealed by a silicone valve or a cap when the cartridges 300 and 400 are not in use or removed from the mixing system 10.

Figure 4A:
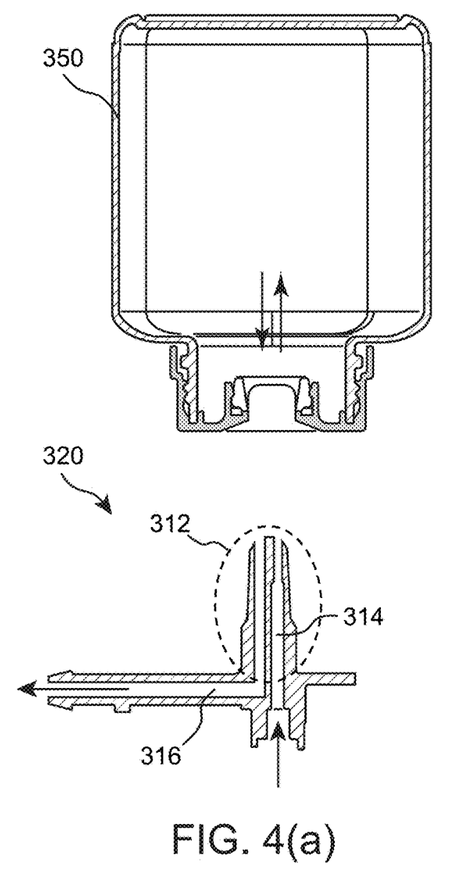
FIG. 4A illustrates a cartridge 350 and a base 320 in accordance with specific embodiments of the present invention.

In specific embodiments of the invention, a cartridge can be positioned on a base. An example of this approach is shown in FIG. 4A, wherein the base 320 provides the connection of the cartridge 350 to the mixing chamber 206. According to another embodiment of the invention, the base 320 includes a needle 312 having at least two channels 314 and 316. The channels 314 and 316 can be of different dimensions (e.g., a smaller dimension channel 314 can act as an air inlet (air aperture) into the cartridge 350 and the larger dimension channel 316 can act as an outlet for the active composition 302 from the cartridge 350).

In specific embodiments of the invention, in which air is forced into the chamber of a cartridge, the air flow into one or more of the chambers can be regulated by a check valve. For example, in FIG. 4B, the air into the channel 314 can be regulated by a check valve 318.

Figure 4B:
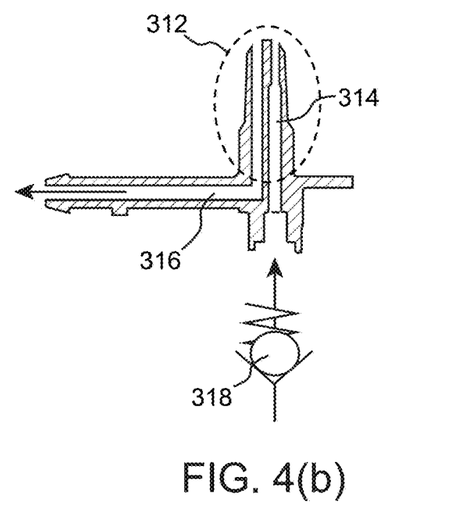
FIG. 4B illustrates the base 320 with a check valve 318 in accordance with specific embodiments of the present invention.
Figure 4C:
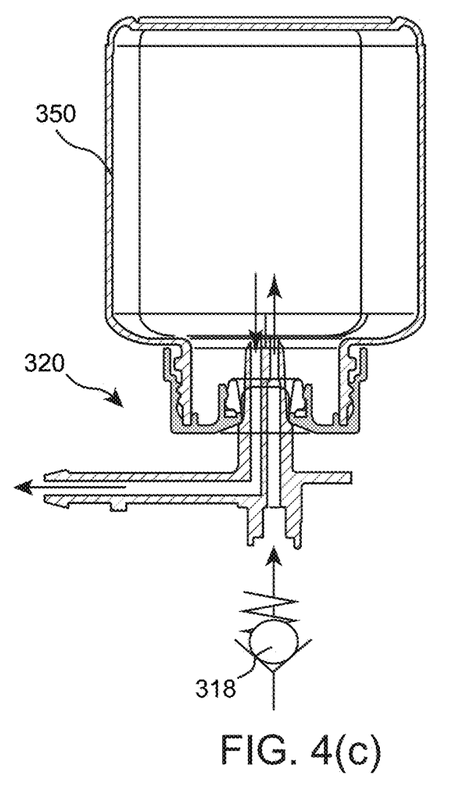
FIG. 4C illustrates the cartridge 350 positioned on the base 320 in accordance with specific embodiments of the present invention.

During the connection of the cartridge 350 to the mixing chamber 206, the base 320 punctures the orifice of the cartridge 350 with the needle 312 such that the air enters into the cartridge 350 via channel 314 and the active composition 302 can be dispensed out from the cartridge 350 via channel 316. The connection of base 320 with the cartridge 350 is shown in FIG. 4C.

The active composition 302 from the cartridge 350 is dispensed after the connection of the base with 320 with the cartridge 350. When the base 320 punctures the cartridge 350, a pressure difference is reached between the interior of the cartridge 350 and the outside air. This pressure difference opens the check valve 318 and the air is injected inside the cartridge 300 through the channel 314. In a particular embodiment of the invention, the air injection can be done in a passive manner. The injected air equalizes the pressure when the active composition 302 is dispensed via the channel 316 from the first cartridge 300.

In specific embodiments of the invention, the channel 316, has a larger dimension than channel 314, and can be configured as an air inlet while channel 314 can be configured as an outlet for dispensing the active composition 302 from the cartridge 350. For instance, the channel 314 can be between 0.8 mm and 5 mm wide while the diameter of the channel can be between 0.5 and 3 mm.

In specific embodiments of the invention, the check valve 318 prevents the active composition 302 from leaking through the smaller channel 314 when the first cartridge 300 is plugged in but not in use.

Figure 5:
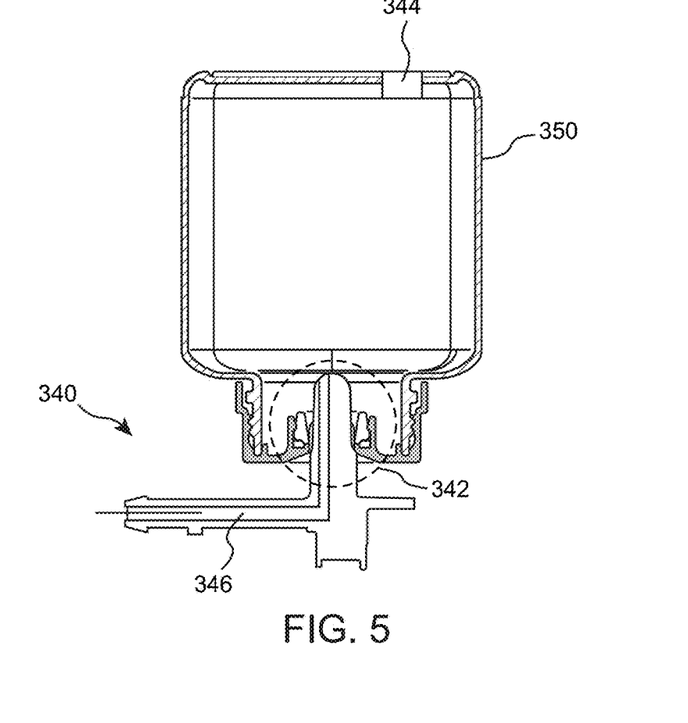
FIG. 5 illustrates the cartridge 350 positioned on the base 340 in accordance with specific embodiments of the present invention.

In specific embodiments of the invention, the base and cartridge interface can be different than that of the approach described with reference to FIG. 4. For example, FIG. 5 shows an arrangement of a base 340 connected to cartridge 350 without the two-channel connection discussed with reference to FIG. 4. In FIG. 5, the base 340 includes a needle 342 having a single channel 346 that allows the dispensing of the active composition 302 from the cartridge 350. In specific embodiments, the needle 342 can be arranged to breach a seal 343 of the cartridge 350. In the approach of FIG. 5, the cartridge 350 itself includes an air inlet/aperture 344. In specific embodiments of the invention, the air inlet 344 can be provided with a check valve for regulating and preventing the active composition 302 from leaking out of the cartridge 350 during transportation and handling. In other embodiment, the check valve permits insertion of air inside the cartridge 350 to equalize the pressure when the active composition 302 is aspirated or dispensed for mixing in the mixing chamber 206. In some further particular examples, the air inlet 344 can be placed at any position on the cartridge 350 including the sides, top, and bottom.

Figure 6A:
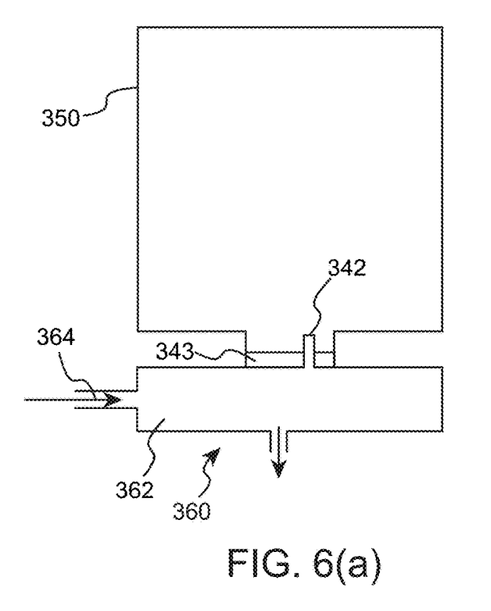
FIGS. 6A, 6B, 6C, and 6D illustrate the cartridge 350 positioned on a base 360 according to an embodiment of the invention in accordance with specific embodiments of the present invention.
Figure 6B:
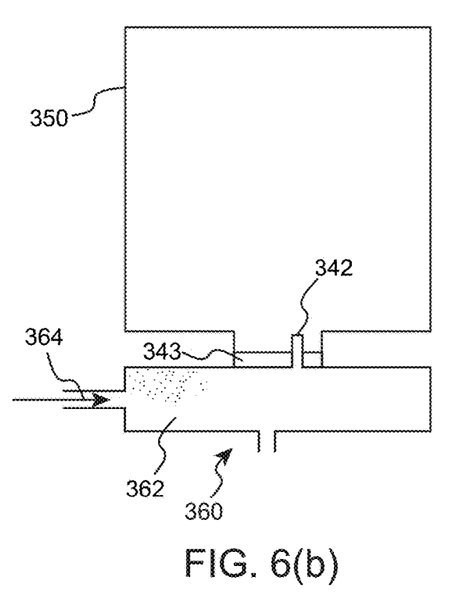
Figure 6C:
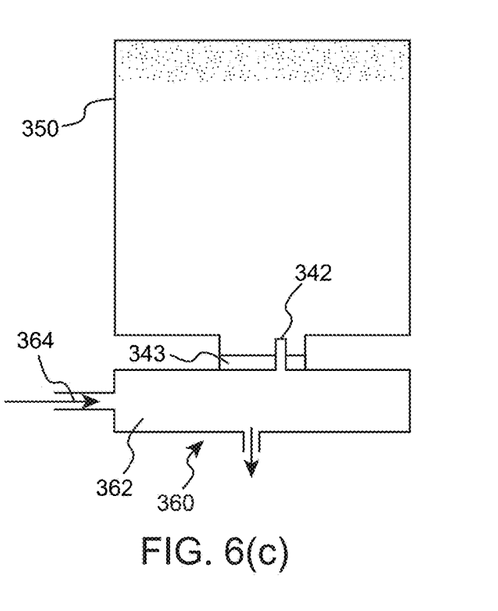
Figure 6D:
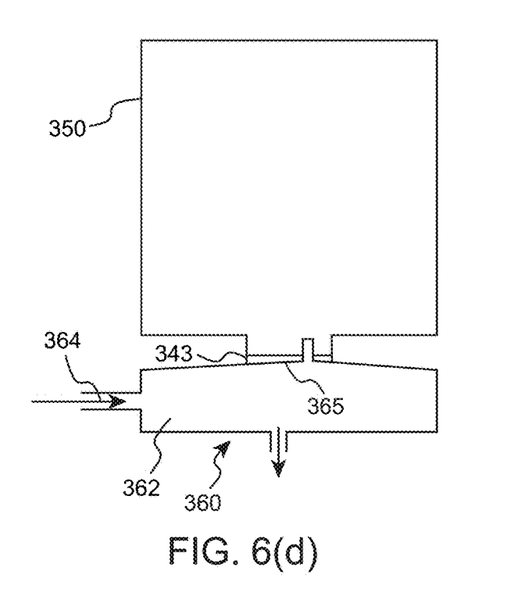

In specific embodiments of the invention, a cartridge can be connected to a mixing chamber via a pre-mixing chamber. In embodiments including a base on which the cartridge rests, the pre-mixing chamber can form part of the base. FIG. 6a includes an example in which a base 360 comprises a pre-mixing chamber 362 having an air inlet 364. The base 360 is connected to the cartridge 350. The pre-mixing chamber 362 is arranged to form a sealed connection with the cartridge 350 when the cartridge 350 is placed on the base 360 thereby forming a snug connection. The volume of the pre-mixing chamber 362 is such that only the active composition 302 is dispensed/aspirated from the cartridge 350. During the dispensing/aspiration of the active composition 302 from the cartridge 350, air enters through the air inlet 364 which accumulates at the top of the pre-mixing chamber 362 as shown in FIG. 6(b). When the aspiration by the base 360 stops, the air accumulated in the pre-mixing chamber 362 is transferred to the top of the cartridge 350 as shown in FIG. 6(c), the air is transferred due to difference of the density between the active solution 302 and the air. In a specific embodiment illustrated in FIG. 6(d) the volume of the pre-mixing chamber includes a light slope 365 on the top surface of the pre-mixing chamber 362 to facilitate the transfer of air towards the air inlet.

During the aspiration of the active composition 302 from the cartridge 350, a pressure difference is developed between the cartridge 350 and the outside air (e.g., in the pre-mixing chamber 362). To equalize the pressure developed in the cartridge 350 and the outside of the cartridge to prevent the deformation of the cartridge, air is injected in the cartridge 350.

In specific embodiment, the cartridge 350 is flexible. The active composition 302 contained in the cartridge 350 is aspirated and the cartridge 350 deforms accordingly.

In the examples of FIGS. 5 and 6, one cartridge 350 is being considered in place of multiple cartridges (i.e. the first cartridge 300 and the second cartridge 400) for the sake of clarity. However, the implementation of such an arrangement can be extended to multiple cartridges arranged to have a mixing effect. Furthermore, some of the embodiments are explained in context of the active composition 302. However, the disclosed embodiments can be extended to similar arrangement for the neutral solution 402 and the second cartridge 400 as well.

Figure 7:
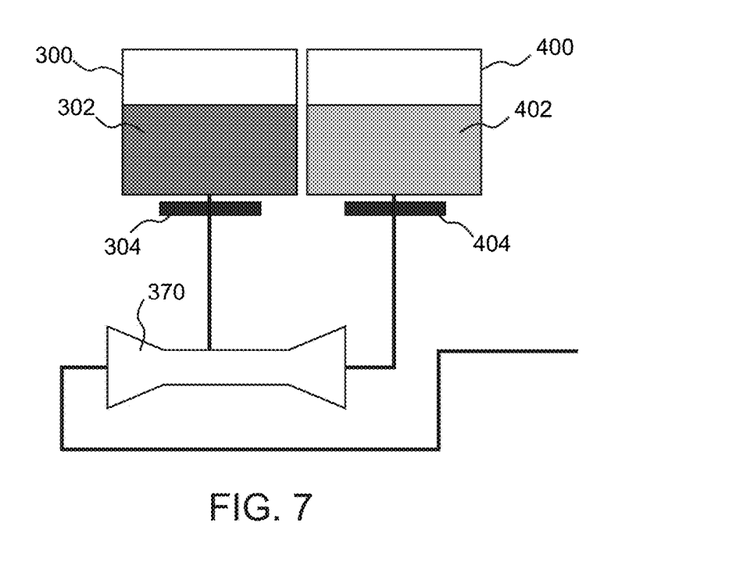
FIG. 7 illustrates a chamber 370 having a venturi effect connected to the cartridges 300, 400 in accordance with specific embodiments of the present invention.

In specific embodiments of the invention, a mixing chamber 370 as shown in FIG. 7 comprises a venturi effect-based arrangement or a venturi effect mixer to control flow rate of the active composition 302 from the first cartridge 300 into the mixing chamber 370. The venturi effect allows for the injection of the active composition 302 in solid, liquid or gaseous phase. The neutral solution 402 is circulated at high velocity into the mixing chamber 370 and due to the venturi effect, a difference of pressure between the mixing chamber 370 and the first cartridge 300 is generated and drives a certain amount of the active composition 302 into the mixing chamber 370. The quantity of the active composition 302 is controlled by the dimensions of the outlet of the first cartridge 300, by the flow rate of the neutral solution 402 and the two flows properties. Furthermore, the active composition 302 and the neutral solution 402 are being partially or totally intermixed in the venturi effect-based arrangement 370.

In specific embodiments of the invention, the active composition 302 and the neutral solution 402 can be dispensed out from the first cartridge 300 and the second cartridge 400 respectively with the help of a pump or by creating vacuum effect or any other means for creating a vacuum.

In specific embodiments of the invention, the mixing system 10 may also be provided with means to control the flow rate of the active composition 302 from the first cartridge 300 into the mixing chamber 206 in accordance with the flow of the neutral solution 402 into the mixing chamber 206. The means to control the flow rate of the active composition 302 may include active or passive means for controlling pressure.

Figure 8A:
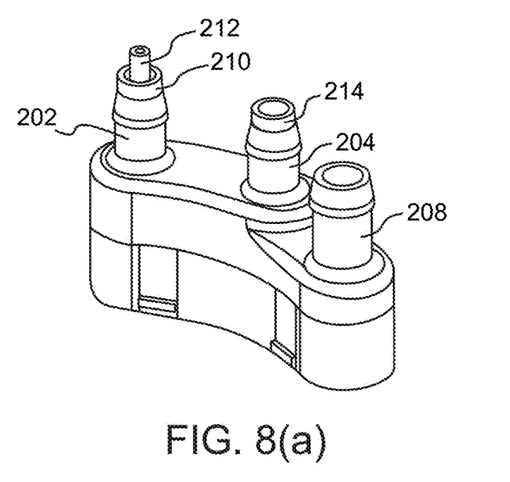
FIGS. 8A and 8B illustrate a perspective views of the housing 200 in accordance with specific embodiments of the present invention.
Figure 8B:
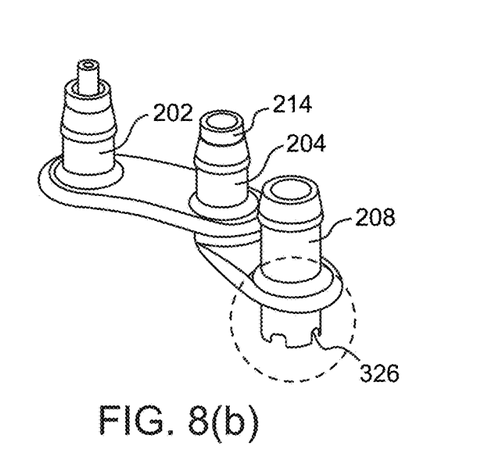

FIGS. 8A and 8B illustrate perspective views of the housing 200 according to specific embodiments of the invention. The housing 200 comprises the first inlet port 202, wherein the first inlet port 202 can include a first soft silicone seal 210 according to an embodiment of the invention. The first inlet port 202 can also be provided with a calibrated needle 212. The calibrated needle 212 can be used to control the flow of the active composition 302 from the first cartridge 300. In yet another embodiment of the invention, the calibrated needle 212 may be configured to be of different dimensions i.e. in some examples, the calibrated needle 212 may be of a thin inner diameter and in others, the calibrated needle 212 may be of a thick inner diameter. The different variations of the calibrated needle 212 help to control the right amount/volume of the active composition 302 dispensed from the first cartridge 300 through the first inlet port 202. The second inlet port 204 can include a second soft silicone seal 214. The first silicone seal 210 and the second silicone seal 214 prevent the leakage of the active composition 302 and the neutral solution 402 from the first cartridge 300 and second cartridge 400 respectively. Additionally, the first silicone seal 210 allows for adaptation of the calibrated needle 212 to the first inlet 202. The housing 200 further includes the outlet port 208 which is configured to connect with the mouthpiece 102 of an oral care appliance. The outlet port 208 can further include a valve mechanism to control the amount of the intermixed solution provided to the mouthpiece 102. The first silicone seal 210 and second silicone seal 214 can be made from a material selected from a group of thermosetting silicone material, rubber, vinyl-methyl-silicone, etc.

In specific embodiment, the inner diameter of the channel 314 is dimensioned so that the flow of liquid is not restrained by the circuit (according to the calibrated flow between 0.5 mL/s and 10 mL/s). That is, so that the pressure losses caused by the small diameter are limited to reach a suitable flow rate of liquid when injected.

In specific embodiment, the overall diameter of the needle 312 is dimensioned so that the part is resistant enough to endure the life cycle of the product. Furthermore, its conical shape ensures a good plugging/unplugging and a good sealing with the flexible valve mechanism. The diameter of the needle is just a little bit smaller than the aperture diameter of the valve mechanism to allow for numerous plugging/unplugging without damaging the valve mechanism as well as ensuring a good sealing between the exterior diameter of the needle and the valve mechanism. The length of the needle 312 is dimensioned so that the part is long enough to penetrate the sealing of the cartridge 350 and short enough so that the apertures are as low as possible in the cartridge 350 to allow for draining of the entire volume of solution contained inside.

In specific embodiments of the invention that are in accordance with FIG. 8B, the housing 200 can include a dip tube 326 to prevent air bubbles from getting aspirated and getting stuck at the top of the housing 200. Limiting the air presence in the housing 200 enhances the accuracy of the dosing. In specific embodiments, the housing can also be provided with a slope which directs the flow of the intermixed solution towards the outlet port 208.

In specific embodiments of the invention, the housing 200 can be made up of any material selected from a group of plastic, Acrylonitrile butadiene styrene (ABS), PVC (polyvinyl chloride), a high-density polyethylene polymer or other such similar materials.

ABS is a thermoplastic copolymer, impact resistant, tough, and with a reasonable heat resistance. ABS is chemically resistant to acids, alkalis and alcohols. ABS is lightweight and injection moldable. All these properties make it suitable as a material for the housing.

Figure 9:
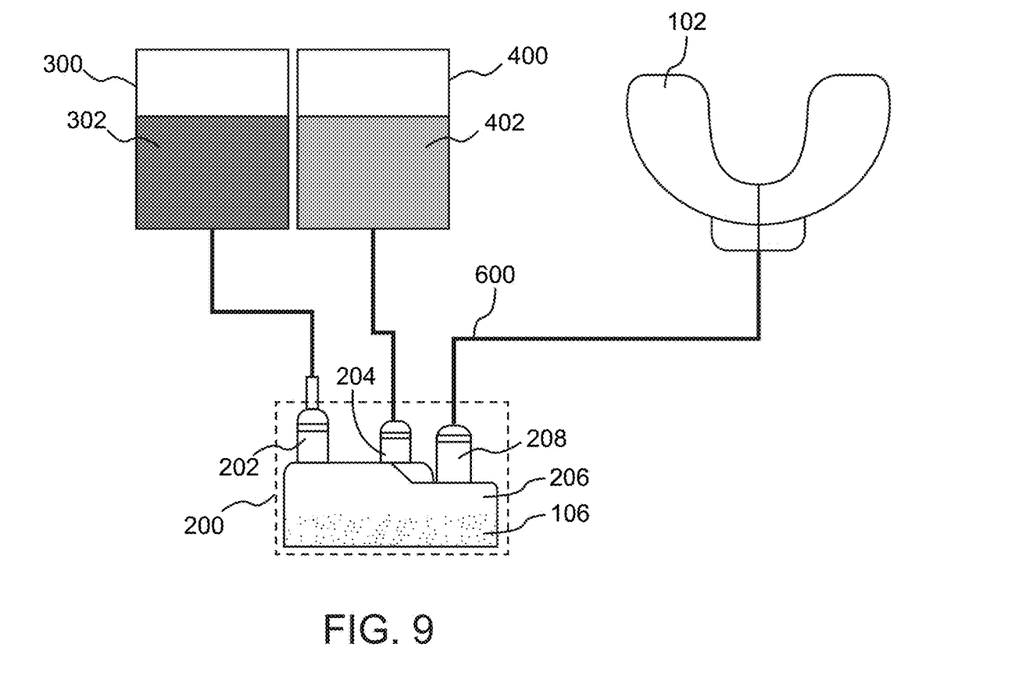
FIG. 9 illustrates a method of preparing an oral care composition 106 to be delivered to the mouthpiece 102 in accordance with specific embodiments of the present invention.

FIG. 9 illustrates a method of preparing an oral care composition 106 to be delivered to the mouthpiece 102 of an oral care appliance. The method comprises aspirating a controlled quantity of at least one active composition 302 and at least one neutral solution 402 into a mixing chamber 206. The active composition 302 is delivered through a first cartridge 300 connected to a first inlet port 202 of the mixing chamber 206 and the neutral solution 402 is delivered through a second cartridge 400 connected to a second inlet port 204 of the mixing chamber 206. The method also includes mixing the active composition 302 with the neutral solution 402 to prepare the oral care composition 106 and delivering the oral care composition 106 to the mouthpiece 102 of an oral care appliance (wherein the mouthpiece 102 is connected to an outlet port 208 of the mixing chamber 206).

In specific embodiments of the invention, the mixing chamber 206 is enclosed in the housing 200. The first inlet port 202, the second inlet port 204 and the outlet port 208 are also installed on the housing 200.

The mixing chamber 206 can be connected to the mouthpiece via a connecting line 600. The connecting line 600 can include a servo valve to regulate the flow of oral care composition 106 or any fluid flowing through the connecting line 600.

In specific embodiments of the invention, the cartridges 300 and 400, the mixing chamber 206, the housing 200, the first inlet port 202, the second inlet port 204, and the outlet port 208 are combined to form a mixing system 10.

In specific embodiments of the invention, the first cartridges 300 and the second cartridges 400 can be combined to form an integrated unit.

In specific embodiments of the invention, the controlled quantity of at least one active composition 302 and at least one neutral solution 402 are aspirated into a mixing chamber 206. The aspiration can be done by a pump or any other aspiration means. A vacuum can be created in the mixing chamber 206 with help of a pump to aspirate the active composition 302 and the neutral solution 402 into the mixing chamber 206.

In specific embodiments of the invention, the vacuum may be created in the mixing chamber 206 using a vacuum pump, peristaltic pump, a tailor-made pump, other one-way pump or two-way pumps.

In a specific example, applying a negative pressure in the mouthpiece 102 relatively to the ambient atmosphere can create vacuum effect inside the cartridges 300 and 400. In another specific example, low pressure inside the mouthpiece 102 can be created by any pressurization means known to the person skilled in the art.

In specific embodiments of the invention, the controlled quantity of at least one active composition 302 is aspirated from the first cartridge 300 into the mixing chamber 206 enclosed within the housing 200. The active composition 302 is mixed with the neutral solution 402 to prepare the oral care composition 106.

In specific embodiments of the invention, the flow rate of the delivery of the active composition 302 from the first cartridge 300 into the mixing chamber 206 can be controlled by flow control means.

In specific embodiment of the invention, the flow control means can be, but not limited to, a Pitot tube, a differential pressure-based flow meter, a volumetric based flow meter, turbine based flow meter, a velocity measurement based flow meter or any other mean designed to measure a flow rate known to a person skilled in the art.

In specific embodiments of the invention, the flow rate of the delivery of the active composition 302 can be controlled by calibrating pressure loss on the first inlet 202.

In specific embodiments of the invention, the flow rate of the delivery of the active composition 302 from the first cartridge 300 into the mixing chamber 206 can be controlled by a valve assembly or a pumping means.

In specific embodiments of the invention, the valve can be mechanically or electrically operated. It can be, but not limited to, a solenoid valve, a servo-valve, a valve controlled by a pneumatic circuit (i.e. pneumatic control valve), any electronic valve with a pinch valve, a membrane valve, or any other fluid distributor arranged with the first cartridge 300 and the second cartridge 400.

To prepare the oral care composition 106, the active composition 302 and the neutral solution 402 can be intermixed by a pumping means, a venturi effect based assembly or a mixing chamber.

In specific embodiments of the invention, the quantity of the active composition 302 diluted with the neutral solution 402 is controlled by the dimensions of the first cartridge 300 relative to the dimensions of the second cartridge 400. In specific embodiments of the invention, the quantity of the active composition 302 diluted with the neutral solution 402 is controlled by the flowrate of the neutral solution 402. In particular embodiments, the quantity of active composition 302 diluted with the neutral solution 402 is controlled by a combination of the above mentioned factors.

Figure 10A:
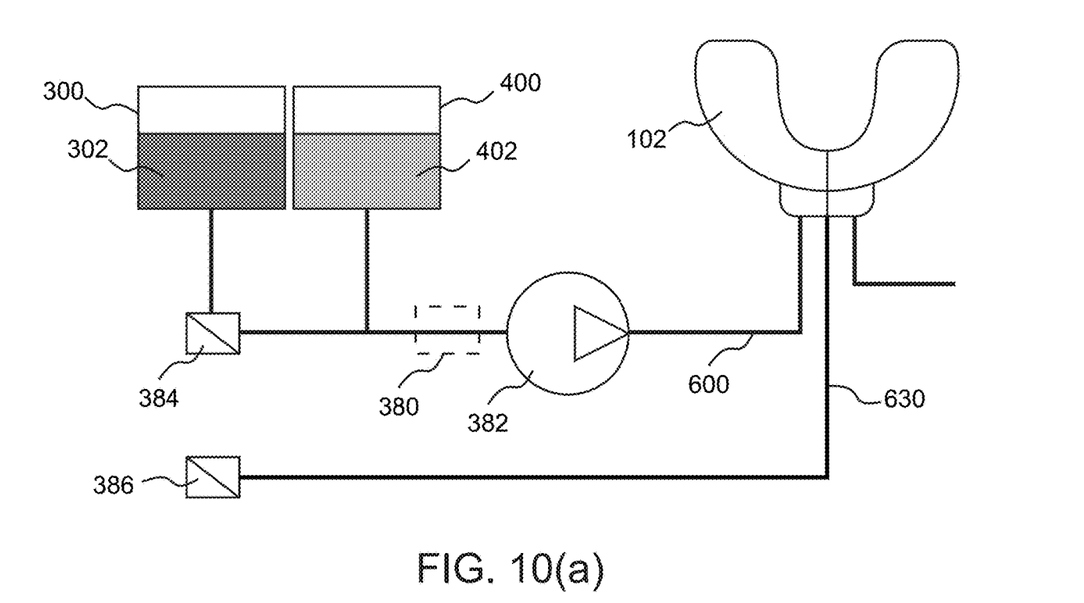
FIG. 10A illustrates an operational mixing chamber 380 provided between a pump 382 and the first cartridge 300 in accordance with specific embodiments of the present invention.

In specific embodiments of the invention as shown in FIG. 10A, an operational mixing chamber 380 can be provided between a pump 382 and the first cartridge 300, wherein the pump 382 is placed between the operational mixing chamber 380 and the mouthpiece 102. The operational mixing chamber 380 can be a calibrated volume and any optional passive configuration that enhances the mixing (e.g., thanks to turbulences) with an inlet linked to the valve 384 and the cartridge 400 and an outlet linked to the pump 382. The operational mixing chamber 380 helps to enhance the mixing of the active composition 302 and the neutral solution 402 before the intermixed oral care composition 106 reaches the mouth of a user through the mouthpiece 102. A valve 384 is also arranged between the operational mixing chamber 380 and the outlet of the first cartridge 300. An additional valve 386 is connected to the mouthpiece 102 via a connection line 630. The pump 382 injects the neutral solution 402 into the connecting line 600 between the second cartridge 400 and the mouthpiece 102 after the closing of valves 384 and 386. Then, the valve 384 opens and the active composition 302 is mixed with the neutral solution 402 and is then pushed into the mouthpiece 102 by the pump 382. In specific embodiments, the mouthpiece is a soft mouthpiece that contracts on the dental arch of the user and the servo valve 386, operationally engaged with the mouthpiece 102, controls the relaxation of the mouthpiece 102.

In specific embodiments, similar methods to those described with reference to FIG. 10a can be practiced without the use of any operational mixing chamber.

In specific embodiments of the invention, the mixing ratio of the active composition 302 and the neutral solution 402 can be controlled by changing the aperture time of the valve 384. The aperture time can be controlled by using a set time defined by a timer, software, a pressure sensor or any other actuating means. The set time, or value of other parameters, can be chosen depending on the requirements of the mixing of the active composition 302 and the neutral solution 402. For instance, the valve 384 state can quickly alternate between open and closed, based on a square signal while the neutral solution 402 is permanently aspirated and injected. Such a method of operation allows for a precise control of the active composition 302 by controlling the parameters of the square signal.

In specific embodiments of the invention, the volume pushed inside the mouthpiece is directly controlled by controlling the running time of the pump 382. The running time of the pump 382 can be controlled using a timer, software, a pressure sensor or any other actuating means according to the requirements of the oral care system. For instance, the valve 384 is constantly in the open state during the injection process, enabling the aspiration of both the active composition 302 and the neutral solution 402.

Figure 10B:
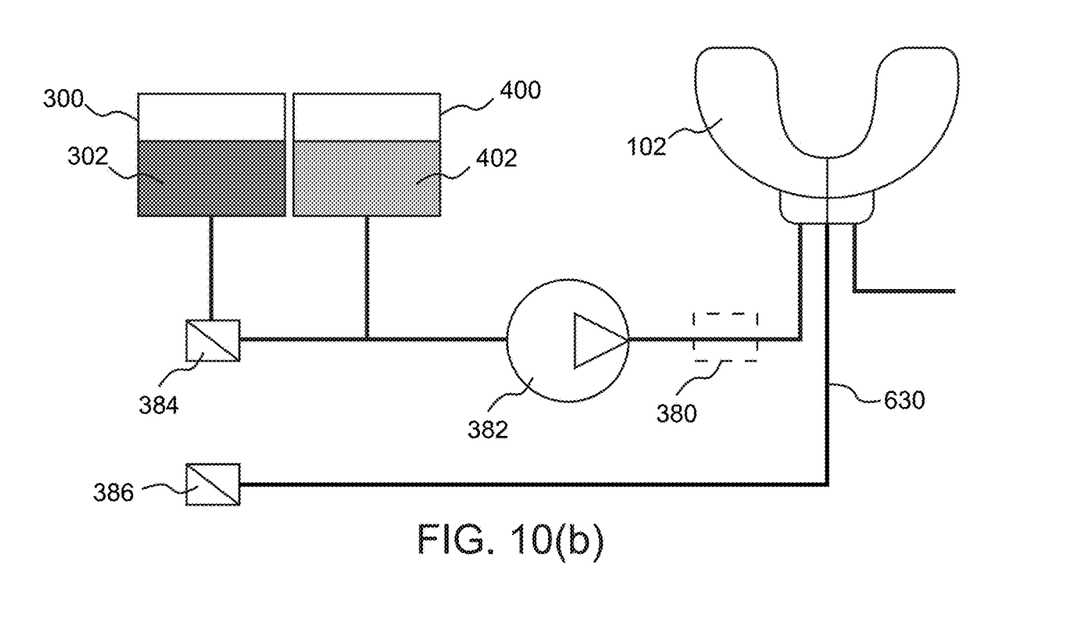
FIG. 10B illustrates the operational mixing chamber 380 can be provided between the pump 382 and the mouthpiece 102 in accordance with specific embodiments of the present invention.

In specific embodiments of the invention, the operational mixing chamber 380 can be configured between the pump 382 and the mouthpiece 102 as shown in FIG. 10B. Embodiments that are in accordance with FIG. 10B differ in that the pump will push both the active composition 302 and the neutral solution 402 into the operational mixing chamber 380, and through said chamber into the mouthpiece as opposed to drawing those elements from the mixing chamber. In a specific example, this mixing chamber enhance the homogeneity of the intermixed solution of the active composition and the neutral solution.

In specific embodiments of the invention, the valves 384 and 386 can be silicon valves or any other electrically or mechanically operated valves.

In specific embodiments of the invention, the pump 382 can be replaced by one or more actuators, a solenoid valve, a servo-valve, a valve controlled by a pneumatic circuit (i.e., a pneumatic control valve), or any electronic valve to perform the functions mentioned above.

Figure 11:
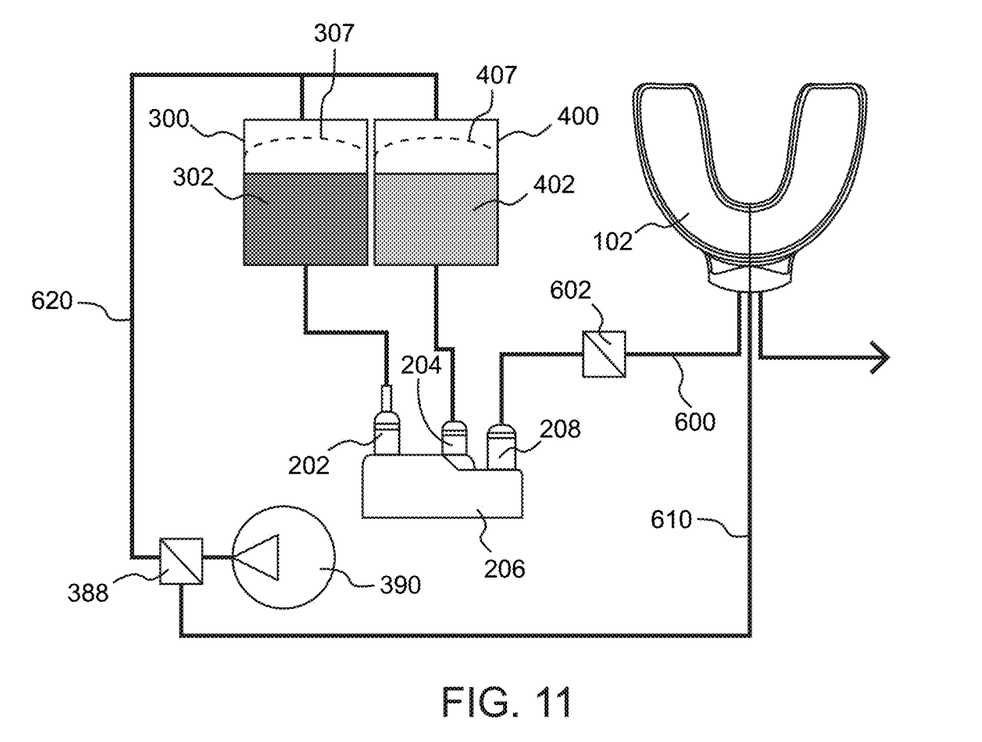
FIG. 11 illustrates the method of preparing the oral care composition 106 using the first cartridge 300 having a membrane 307 and the second cartridge 400 with the membrane 407 in accordance with specific embodiments of the present invention.

A method of preparing an oral care composition using a first cartridge 300 having a membrane 307 and a second cartridge 400 having a membrane 407 can be described with reference to FIG. 11. The membranes 307 and 407 of the cartridges 300 and 400 are flexible in nature and can be deformed to push the active composition 302 out from the first cartridge 300 and the neutral solution 402 out from the second cartridge 400 under the effect of pressure. The cartridges 300 and 400 are connected to a valve 388 and a pump 390 via a connecting line 620. The valve 388 is also connected to the mouthpiece 102 via a connecting line 610. The connecting line 600 is provided with a valve 602 in between the mouthpiece 102 and the chamber 206. The method of preparing the oral care composition comprises the steps of: opening the valve 388 thereby enabling the pump 390 to push the membranes 307, 407 and consequently dispensing the active composition 302 from the first cartridge 300 and the neutral solution 402 from the second cartridge 400. The active composition 302 and the neutral solution 402 are mixed in the mixing chamber 206 to provide the oral care composition therein and lastly, opening the valve 602 for injecting the oral care composition to the mouthpiece 102 through the connection line 600.

In specific embodiments of the invention, the mouthpiece is a soft mouthpiece that contracts on the dental arch of the user and the valve 388 may be a two-way valve, thus enabling the pump 390 to perform a dual action. One action is to push the membranes 307 and 407 when the valve 388 opens along with connecting line 620, and another action is to control the relaxation of the mouthpiece 102. This second action can additionally create a jet effect to push the oral care composition 106 inside the mouthpiece 102 by closing the valve 388 along the connecting line 620 while opening the valve 388 along the connecting line 610.

In specific embodiments of the invention, the first cartridge 300 and the second cartridge 400 can be inflatable cartridges. The inflatable cartridges 300 and 400 are made up of a soft membrane that allows the volume of cartridges 300 and 400 to drop on the application of pressure through a pump 390 thereby preventing the need of injecting the air in the cartridges 300 and 400 for dispensing the active composition 302 and the neutral solution 402. Furthermore, while under-pressure, the solutions flowing out of the cartridge 300 and 400 is steady and easier to monitor.

One or more of the above-mentioned embodiments/steps of the present invention can be automated completely or partially using one or more of a control system, timer, software, pressure sensor, or any other actuating means. The valves and the pumps as discussed in the embodiments of the invention can be controlled by the way of timer or pressure sensor.

Although the invention has been described with regard to its embodiments, specific embodiments and various examples, it should be understood that various changes and modifications as would be obvious to one having the ordinary skill in this art may be made without departing from the scope of the invention as set forth in the claims appended hereto.

What is claimed is:

1. An oral care appliance comprising:
   a housing with a first inlet port and a second inlet port;
   a first cartridge: (i) connected to the first inlet port; and (ii) holding a concentrated active composition;
   a second cartridge: (i) connected to the second inlet port; and (ii) holding a neutral solution;
   a mixing chamber: (i) enclosed within the housing; and (ii) configured to intermix a controlled quantity of the concentrated active composition as received through the first inlet port with the neutral solution as received through the second inlet port;
   a base for the first cartridge, wherein the base connects the first cartridge with the mixing chamber;
   an orifice in the first cartridge to dispense the concentrated active composition from the first cartridge and inject air into the first cartridge;
   a needle in the base, wherein the needle punctures the first cartridge at the orifice, and wherein the needle has a first channel and a second channel;
   wherein the first channel has a smaller dimension than the second channel; and
   wherein the oral care appliance is configured to: (i) inject air into the first cartridge using the first channel; and (ii) dispense the concentrated active composition from the first cartridge into the mixing chamber using the second channel.

2. The oral care appliance according to claim 1, further comprising an outlet port located on the housing and connected to a mouthpiece of the oral care appliance.

3. The oral care appliance according to claim 1, wherein the first cartridge is a rigid sealed cartridge.

4. The oral care appliance according to claim 1, wherein the oral care appliance is configured to control a flow rate of the concentrated active composition from the first cartridge into the mixing chamber in accordance with a flow of the neutral solution into the mixing chamber.

5. The oral care appliance according to claim 4, further comprising:
   a first cartridge outlet of the first cartridge, wherein the first cartridge outlet is connected to the first inlet port; and
   wherein the flow rate of the concentrated active composition from the first cartridge into the mixing chamber is controlled by calibrating a pressure loss on the first cartridge outlet.

6. The oral care appliance according to claim 4, wherein the flow rate of the concentrated active composition from the first cartridge into the mixing chamber is controlled by one of: a servo valve; and a pump.

7. The oral care appliance according to claim 1, further comprising at least one orifice in the first cartridge to dispense the concentrated active composition from the first cartridge and inject air into the first cartridge.

8. The oral care appliance according to claim 1, further comprising a pre-mixing chamber with an air aperture, wherein the pre-mixing chamber is located in the base.

9. The oral care appliance of claim 8, wherein the pre-mixing chamber forms a sealed connection with the first cartridge when the first cartridge is positioned on the base.

10. The oral care appliance according to claim 1, wherein the mixing chamber comprises a venturi-effect based arrangement to control a flow rate of the concentrated active composition from the first cartridge into the mixing chamber.

11. A method of using the oral care appliance of claim 1 to prepare an oral care composition to be delivered to a mouthpiece of the oral care appliance, the method comprising:
   aspirating into the mixing chamber: (i) a first controlled quantity of at least one active composition through the first cartridge connected to the first inlet port of the mixing chamber; and (ii) a second controlled quantity of at least one neutral solution through the second cartridge connected to the second inlet port of the mixing chamber;
   mixing, in the mixing chamber, the active composition with the neutral solution to prepare the oral care composition; and
   delivering the oral care composition to the mouthpiece of the oral care appliance via an outlet port of the mixing chamber.

12. The method according to claim 11, wherein the active composition comprises at least one concentrated cleaning agent.

13. The method according to claim 11, wherein the first cartridge and the second cartridge form an integrated unit.

14. The method according to claim 11, wherein the controlled quantity of the active composition is controlled by controlling a flow rate of the delivery of the active composition from the first cartridge into the mixing chamber.

15. The method according to claim 14, further comprising:
   controlling the flow rate of the active composition from the first cartridge into the mixing chamber by calibrating a pressure loss on a first cartridge outlet;
   wherein the first cartridge outlet is connected to the first inlet port of the mixing chamber.

16. The method according to claim 14, further comprising:
   controlling the flow rate of the active composition from the first cartridge into the mixing chamber by controlling one of: a servo valve and a pump.

17. The method according to claim 14, further comprising:
   controlling the flow rate of the active composition from the first cartridge into the mixing chamber using a venturi-effect based arrangement.

18. The method according to claim 11, wherein the base comprises a pre-mixing chamber with an air aperture.

19. The method according to claim 18, wherein the pre-mixing chamber forms a sealed connection with the first cartridge when the first cartridge is positioned on the base.

* * * * *